(12) United States Patent
Cross, Jr. et al.

(10) Patent No.: US 8,938,392 B2
(45) Date of Patent: Jan. 20, 2015

(54) CONFIGURING A SPEECH ENGINE FOR A MULTIMODAL APPLICATION BASED ON LOCATION

(75) Inventors: Charles W. Cross, Jr., Wellington, FL (US); Igor R. Jablokov, Charlotte, NC (US)

(73) Assignee: Nuance Communications, Inc., Burlington, MA (US)

( * ) Notice: Subject to any disclaimer, the term of this patent is extended or adjusted under 35 U.S.C. 154(b) by 1147 days.

(21) Appl. No.: 11/679,297

(22) Filed: Feb. 27, 2007

(65) Prior Publication Data
US 2008/0208592 A1 Aug. 28, 2008

(51) Int. Cl.
*G10L 21/00* (2013.01)
*G10L 25/00* (2013.01)
*G10L 15/24* (2013.01)

(52) U.S. Cl.
CPC ...................................... *G10L 15/24* (2013.01)
USPC ............ 704/270; 704/231; 704/244; 704/275

(58) Field of Classification Search
CPC ....... G10L 15/00; G10L 15/22; G10L 13/086; G06F 17/289
USPC ...................................... 704/270, 275, 8, 231
See application file for complete search history.

(56) References Cited

U.S. PATENT DOCUMENTS 5,524,169 A * 6/1996 Cohen et al. .................. 704/231
5,577,165 A 11/1996 Takebayashi et al.
5,584,052 A 12/1996 Galau et al.
5,896,388 A * 4/1999 Earnest ....................... 370/230.1

(Continued)

FOREIGN PATENT DOCUMENTS

CN 1385783 12/2002
CN 1385783 A 12/2002

(Continued)

OTHER PUBLICATIONS

"Global Positioning System." Wikipedia. Retrieved Aug. 14, 2013, from http://en.wikipedia.org/wiki/Global_Positioning_System.*

(Continued)

*Primary Examiner* — Shaun Roberts
(74) *Attorney, Agent, or Firm* — Wolf, Greenfield & Sacks, P.C.

(57) ABSTRACT

Methods, apparatus, and products are disclosed for configuring a speech engine for a multimodal application based on location. The multimodal application operates on a multimodal device supporting multiple modes of user interaction with the multimodal application. The multimodal application is operatively coupled to a speech engine. Configuring a speech engine for a multimodal application based on location includes: receiving a location change notification in a location change monitor from a device location manager, the location change notification specifying a current location of the multimodal device; identifying, by the location change monitor, location-based configuration parameters for the speech engine in dependence upon the current location of the multimodal device, the location-based configuration parameters specifying a configuration for the speech engine at the current location; and updating, by the location change monitor, a current configuration for the speech engine according to the identified location-based configuration parameters.

11 Claims, 6 Drawing Sheets

(56) References Cited

U.S. PATENT DOCUMENTS

| | | | |
|---|---|---|---|
| 5,969,717 A | 10/1999 | Ikemoto | |
| 6,011,461 A * | 1/2000 | Luper | 340/441 |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,332,127 B1 * | 12/2001 | Bandera et al. | 705/14.55 |
| 6,385,586 B1 * | 5/2002 | Dietz | 704/277 |
| 6,452,498 B2 * | 9/2002 | Stewart | 340/573.1 |
| 6,483,896 B1 * | 11/2002 | Goldberg et al. | 379/88.01 |
| 6,513,011 B1 | 1/2003 | Uwakubo | |
| 6,606,599 B2 | 8/2003 | Grant et al. | |
| 6,807,529 B2 | 10/2004 | Johnson et al. | |
| 6,856,960 B1 | 2/2005 | Dragosh et al. | |
| 6,871,213 B1 | 3/2005 | Graham et al. | |
| 6,904,401 B1 | 6/2005 | Hauduc et al. | |
| 6,920,425 B1 | 7/2005 | Will et al. | |
| 6,944,447 B2 * | 9/2005 | Portman et al. | 455/422.1 |
| 6,999,930 B1 | 2/2006 | Roberts et al. | |
| 7,016,845 B2 | 3/2006 | Vora et al. | |
| 7,035,805 B1 | 4/2006 | Miller | |
| 7,509,569 B2 | 12/2006 | Barrus et al. | |
| 7,171,243 B2 | 1/2007 | Watanabe et al. | |
| 7,188,067 B2 | 3/2007 | Grant et al. | |
| 7,209,514 B2 * | 4/2007 | Tanaka et al. | 375/150 |
| 7,225,125 B2 * | 5/2007 | Bennett et al. | 704/233 |
| 7,330,890 B1 | 2/2008 | Partovi et al. | |
| 7,373,598 B2 | 5/2008 | Vora | |
| 7,376,586 B1 | 5/2008 | Partovi et al. | |
| 7,433,682 B1 | 10/2008 | Moll et al. | |
| 7,437,295 B2 * | 10/2008 | Pitts et al. | 704/275 |
| 7,487,085 B2 | 2/2009 | Cross | |
| 7,653,543 B1 * | 1/2010 | Blair et al. | 704/270 |
| 2001/0014861 A1 * | 8/2001 | Oh | 704/270.1 |
| 2002/0065944 A1 | 5/2002 | Hickey et al. | |
| 2002/0071573 A1 * | 6/2002 | Finn | 381/93 |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2002/0188451 A1 | 12/2002 | Guerra et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0191639 A1 * | 10/2003 | Mazza | 704/231 |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Seinel et al. | |
| 2004/0030554 A1 * | 2/2004 | Boxberger-Oberoi et al. | 704/260 |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0193398 A1 * | 9/2004 | Chu et al. | 704/3 |
| 2004/0193420 A1 * | 9/2004 | Kennewick et al. | 704/257 |
| 2004/0216036 A1 | 10/2004 | Chu et al. | |
| 2004/0236574 A1 | 11/2004 | Ativanichayaphong | |
| 2004/0260562 A1 | 12/2004 | Kijirai | |
| 2005/0075884 A1 | 4/2005 | Badt | |
| 2005/0080632 A1 * | 4/2005 | Endo et al. | 704/277 |
| 2005/0091059 A1 | 4/2005 | Lecoeuche | |
| 2005/0131701 A1 | 6/2005 | Cross | |
| 2005/0138219 A1 | 6/2005 | Boughannam et al. | |
| 2005/0138647 A1 | 6/2005 | Boughannam et al. | |
| 2005/0144001 A1 * | 6/2005 | Bennett et al. | 704/252 |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0032225 A1 | 2/2007 | Konicek et al. | |
| 2007/0124057 A1 * | 5/2007 | Prieto et al. | 701/200 |
| 2007/0219804 A1 | 9/2007 | Asayama | |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | |
|---|---|---|
| CN | 1564123 A | 1/2005 |
| EP | 0794670 A | 9/1997 |
| EP | 1450350 | 8/2004 |
| EP | 1538025 A1 * | 6/2005 |

(56) References Cited

FOREIGN PATENT DOCUMENTS

| JP | 2000155529 A | 6/2000 |
|---|---|---|
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.
Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].
W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].
W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].
PCT Search Report, Jun. 25, 2008; PCT Application No. ; PCT/EP2008/051358.
PCT Search Report, Jun. 18, 2008; PCT Application No. ; PCT/EP2008/051363.
Didier Guillevic, et al.,Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

* cited by examiner

CONFIGURING A SPEECH ENGINE FOR A MULTIMODAL APPLICATION BASED ON LOCATION

BACKGROUND OF THE INVENTION

1. Field of the Invention

The field of the invention is data processing, or, more specifically, methods, apparatus, and products for configuring a speech engine for a multimodal application based on location.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current multimodal applications support a voice mode of user interaction using a speech engine. A speech engine provides recognition and generation or 'synthesis' of human speech. Speech engines may be optimized for use with particular a language or dialect to better support user interaction in a particular part of the world. The drawback to current multimodal architectures, however, is that they do not provide a mechanism for seamlessly reconfiguring a speech engine as the multimodal device moves from one location to another. As such, readers will therefore appreciate that room for improvement exists for configuring a speech engine for a multimodal application based on location.

SUMMARY OF THE INVENTION

Methods, apparatus, and products are disclosed for configuring a speech engine for a multimodal application based on location. The multimodal application operates on a multimodal device supporting multiple modes of user interaction with the multimodal application, including a voice mode and one or more non-voice modes. The multimodal application is operatively coupled to a speech engine. Configuring a speech engine for a multimodal application based on location includes: receiving a location change notification in a location change monitor from a device location manager, the device location manager operatively coupled to a position detection component of the multimodal device, the location change notification specifying a current location of the multimodal device; identifying, by the location change monitor in a configuration parameter repository, location-based configuration parameters for the speech engine in dependence upon the current location of the multimodal device, the location-based configuration parameters specifying a configuration for the speech engine at the current location; and updating, by the location change monitor, a current configuration for the speech engine according to the identified location-based configuration parameters.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
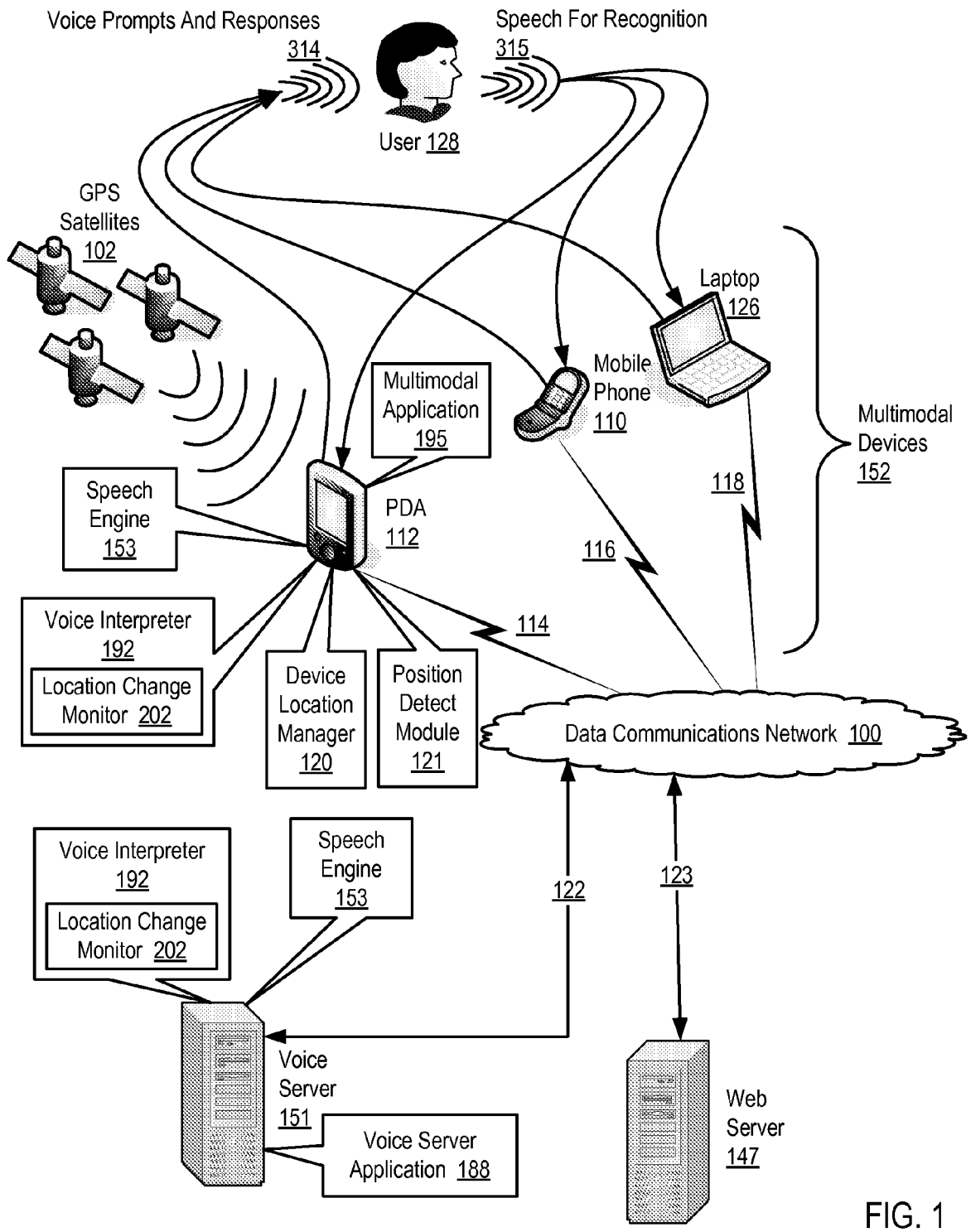
FIG. 1 sets forth a network diagram illustrating an exemplary system for configuring a speech engine for a multimodal application based on location according to embodiments of the present invention.

Exemplary methods, apparatus, and products for configuring a speech engine for a multimodal application based on location according to embodiments of the present invention are described with reference to the accompanying drawings, beginning with FIG. 1. FIG. 1 sets forth a network diagram illustrating an exemplary system for configuring a speech engine (153) for a multimodal application (195) based on location according to embodiments of the present invention. Configuring a speech engine (153) for a multimodal application (195) based on location in this example is implemented with a multimodal application (195) operating on a multimodal device (152). The multimodal device (152) supports multiple modes of user interaction with the multimodal application (195) including a voice mode and one or more non-voice modes of user interaction with the multimodal application (195). The voice mode is represented here with audio output of voice prompts and responses (314) from the multimodal devices (152) and audio input of speech for recognition (315) from a user (128). Non-voice modes are represented by input/output devices such as keyboards and display screens on the multimodal devices (152). The voice mode of user interaction with the multimodal application is supported by a voice interpreter (192), through which the multimodal application (195) is operatively coupled to a speech engine (153). The operative coupling may be implemented with an application programming interface ('API'), a voice service module, or a VOIP connection as explained in more detail below.

In the exemplary system of FIG. 1, the voice interpreter (192) supports the voice mode of user interaction with the multimodal application (195) by providing grammars, speech for recognition, and text prompts for speech synthesis to the speech engine (153), and by returning to the multimodal application (195) speech engine output in the form of recognized speech, semantic interpretation results, and digitized speech for voice prompts. The implementation of the voice interpreter (192) typically depends on the technology implementing the multimodal application (195). The voice interpreter (192) of FIG. 1 may be implemented as a VoiceXML interpreter when the multimodal application (195) implements X+V. A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). When the multimodal application (195) is implemented according to SALT, the voice interpreter (192) may be implemented as a SALT interpreter. When the multimodal application (195) is implemented using Java, the voice interpreter (192) may be implemented using a VoiceXML interpreter that exposes a Java interface.

In the example of FIG. 1, the voice interpreter (192) includes a location change monitor (202), a software component that operates to configure a speech engine (153) for a multimodal application (195) based on location according to embodiments of the present invention. The location change monitor (202) of FIG. 1 configures a speech engine (153) for a multimodal application (195) based on location according to embodiments of the present invention by receiving from a device location manager (120) a location change notification that specifies a current location of the multimodal device, identifying, in a configuration parameter repository, location-based configuration parameters for the speech engine (153) in dependence upon the current location of the multimodal device, and updating a current configuration for the speech engine (153) according to the identified location-based configuration parameters. The location-based configuration parameters specify a configuration for the speech engine (153) at the current location. Although FIG. 1 illustrates the location change monitor (202) as a component of the voice interpreter (192), readers will note that such an illustration is for explanation and not for limitation. In fact, the location change monitor (202) may be implemented as a component of the speech engine (153).

As mentioned above, the location change monitor (202) receives a location change notification from the device location manager (120). The device location manager (120) is a software module that includes computer program instructions for determining the current location of the multimodal device (152) using geographic coordinates of the multimodal device provided by a position detection component, and providing the current location in a location change notification to the location change monitor (202). The location of the multimodal device (152) may be specified as the geographic coordinates provided by the position detection component such as, for example, (26°38'7.27"N, 80°13'37.22"W). The location of the multimodal device (152), however, may also be specified as a semantic representation of the coordinates such as, for example, 'home,' 'work,' or 'church.'

In the example of FIG. 1, the device location manager (120) is operatively coupled to a position detection component (not shown) of the multimodal device (152). A position detection component is a component, typically implemented using a combination of hardware and software, that calculates geographic coordinates representing the current position of the multimodal device. In the exemplary system of FIG. 1, the position detection component is implemented using a global positioning system ('GPS') receiver that calculates the geographic coordinates of the device based on the device's position relative to a group of GPS satellites (102). The use of GPS, however, is for explanation and not for limitation. In other embodiments of the present invention, the position detection component may be implemented using a Long Range Navigation ('LORAN') receiver that calculates the geographic coordinates of the device based on the device's position relative to a group of LORAN radio transmission towers or any other component for calculating the geographic coordinate of a multimodal device as will occur to those of skill in the art. In still other embodiments, the position detection component may determine the geographic coordinates of the multimodal device using the signals from cell phone towers to triangulate the position of the multimodal device.

In the example of FIG. 1, the device location manager (120) is 'operatively coupled' to a position detection component in the sense that the device location manager (120) communicates with a position detection module (121), a software driver that provides interaction with the position detection component through an exposed API. Such communication may occur locally on the multimodal device (152) when the device location manager (120) is installed on the multimodal device (152) as illustrated in FIG. 1 or may occur across a network when the device location manager (120) is installed on a server, which manages the locations of multiple multimodal devices (152).

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:
- personal digital assistant ('PDA') (112) which is coupled for data communications to data communications network (100) through wireless connection (114),
- mobile telephone (110) which is coupled for data communications to data communications network (100) through wireless connection (116), and
- laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled
 RTP Payload Format for European Telecommunications Standards Institute (ETSI) European Standard ES 201 108 Distributed Speech Recognition Encoding
and the Internet Draft entitled
 RTP Payload Formats for European Telecommunications Standards Institute (ETSI) European Standard ES 202 050, ES 202 211, and ES 202 212 Distributed Speech Recognition Encoding,
the IETF provides standard RTP payload formats for various codecs. It is useful to note, therefore, that there is no limitation in the present invention regarding codecs, payload formats, or packet structures. Speech for configuring a speech engine for a multimodal application based on location according to embodiments of the present invention may be encoded with any codec, including, for example:
 AMR (Adaptive Multi-Rate Speech coder)
 ARDOR (Adaptive Rate-Distortion Optimized sound codeR),
 Dolby Digital (A/52, AC3),
 DTS (DTS Coherent Acoustics),
 MP1 (MPEG audio layer-1),
 MP2 (MPEG audio layer-2) Layer 2 audio codec (MPEG-1, MPEG-2 and non-ISO MPEG-2.5),
 MP3 (MPEG audio layer-3) Layer 3 audio codec (MPEG-1, MPEG-2 and non-ISO MPEG-2.5),
 Perceptual Audio Coding,
 FS-1015 (LPC-10),
 FS-1016 (CELP),
 G.726 (ADPCM),
 G.728 (LD-CELP),
 G.729 (CS-ACELP),
 GSM,
 HILN (MPEG-4 Parametric audio coding), and
 others as may occur to those of skill in the art.

As mentioned, a multimodal device according to embodiments of the present invention is capable of providing speech to a speech engine (153) for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (153) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (112) of the multimodal devices (152) in the system of FIG. 1 is shown with a speech engine (153), but readers will recognize that any multimodal device may have a speech engine according to embodiments of the present invention.

As shown in FIG. 1, a speech engine (153) and a voice interpreter (192) may be installed locally in the multimodal device (112) itself, or a speech engine (153) and a voice interpreter (192) may be installed remotely with respect to the multimodal device, across a data communications network (100) in a voice server (151). In a thick client architecture, a multimodal device (152) includes both its own speech engine (153) and its own voice interpreter (192). The voice interpreter (192) exposes an API to the multimodal application (195) for use in providing speech recognition and speech synthesis for the multimodal application. The multimodal application provides, for example, dialog instructions, VoiceXML <form> elements, grammars, input elements, event handlers, and so on, through the API to the voice interpreter (192), and the voice interpreter (192) administers the speech engine on behalf of the multimodal application. In the thick client architecture, a multimodal application, including for example, VoiceXML dialogs, is interpreted by a voice interpreter on the multimodal device. In the thin client architecture, a multimodal application, including for example VoiceXML dialogs, is interpreted by a voice interpreter on a voice server (151) located remotely across a data communications network (100) from the multimodal device running the multimodal application (195).

In a thin client architecture, the speech engine (153) and the voice interpreter (192) are located remotely from the multimodal client device in a voice server (151), the API for the voice interpreter is still implemented in the multimodal device, with the API modified to communicate voice dialog instructions, speech for recognition, and text and voice prompts to and from the voice interpreter on the voice server. For ease of explanation, only one (112) of the multimodal devices (152) in the system of FIG. 1 is shown with a voice interpreter (192), but readers will recognize that any multimodal device may have a voice interpreter according to embodiments of the present invention.

The use of these three example multimodal devices (152) is for explanation only, not for limitation of the invention. Any automated computing machinery capable of accepting speech from a user, providing the speech digitized to a speech engine through a voice interpreter, and receiving and playing speech prompts and responses from the voice interpreter may be improved to function as a multimodal device for configuring a speech engine for a multimodal application based on location according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for configuring a speech engine for a multimodal application based on location according to embodiments of the present invention is a data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a voice interpreter (192) and speech engine (153) in the multimodal device itself or by use of a voice interpreter (192) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for configuring a speech engine for a multimodal application based on location according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Configuring a speech engine for a multimodal application based on location according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in configuring a speech engine for a multimodal application based on location according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to carry out configuring a speech engine for a multimodal application based on location according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine and supports a Java voice framework by providing responses to HTTP requests from Java client applications running on multimodal devices. And voice server applications that support configuring a speech engine for a multimodal application based on location may be implemented in other ways as may occur to those of skill in the art, and all such ways are well within the scope of the present invention.

Also stored in RAM is a voice interpreter (192), a module of computer program instructions that supports the voice mode of user interaction with a multimodal application operating on a multimodal device. The voice interpreter (192) provides speech engine input such as grammars, speech for recognition, and text prompts for speech synthesis to the speech engine (153) and returns to the multimodal application speech engine output in the form of recognized speech, semantic interpretation results, and digitized speech for voice prompts. Input to voice interpreter (192) may originate, for example, from VoiceXML clients running remotely on multimodal devices, from X+V clients running remotely on multimodal devices, from SALT clients running on multimodal devices, or from Java client applications running remotely on multimodal devices. In this example, voice interpreter (192) interprets and executes VoiceXML segments representing voice dialog instructions received from remote multimodal devices and provided to voice interpreter (192) through voice server application (188).

When implemented in X+V, a multimodal application in a thin client architecture may provide voice dialog instructions, VoiceXML segments, VoiceXML <form> elements, and the like, to voice interpreter (149) through data communications across a network with the multimodal application. The voice dialog instructions include one or more grammars, data input elements, event handlers, and so on, that advise the voice interpreter how to administer voice input from a user and voice prompts and responses to be presented to a user. The voice interpreter (192) administers such dialogs by processing the dialog instructions sequentially in accordance with a VoiceXML Form Interpretation Algorithm ('FIA'). The voice interpreter (192) interprets VoiceXML dialogs provided to the voice interpreter (192) by a multimodal application.

To provide voice services to a multimodal application, the voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes grammars (104), lexicons (106), and language-specific acoustic models (108). Each lexicon (106) and language-specific acoustic model (108) may be associated with a separate language in a configuration parameter repository (200).

The language-specific acoustic models (108) are a data structures or tables in a database, for example, that associates SFVs with phonemes representing, to the extent that it is practically feasible to do so, all pronunciations of all the words in various a human languages, each language having a separate acoustic model (108). The lexicons (106) are associations of words in text form with phonemes representing pronunciations of each word; the lexicon effectively identifies words that are capable of recognition by an ASR engine. Each language has a separate lexicon (106). Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammars (104) communicate to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in configuring a speech engine for a multimodal application based on location according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone
    <name><when>;
```

```
    <name> = bob | martha | joe | pete | chris | john | artoush | tom;
    <when> = today | this afternoon | tomorrow | next week;
]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom', and the <when> rule accepts 'today' or 'this afternoon' or 'tomorrow' or 'next week.' The command grammar as a whole matches utterances like these, for example:
  "phone bob next week,"
  "telephone martha this afternoon,"
  "remind me to call chris tomorrow," and
  "remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Figure 2:
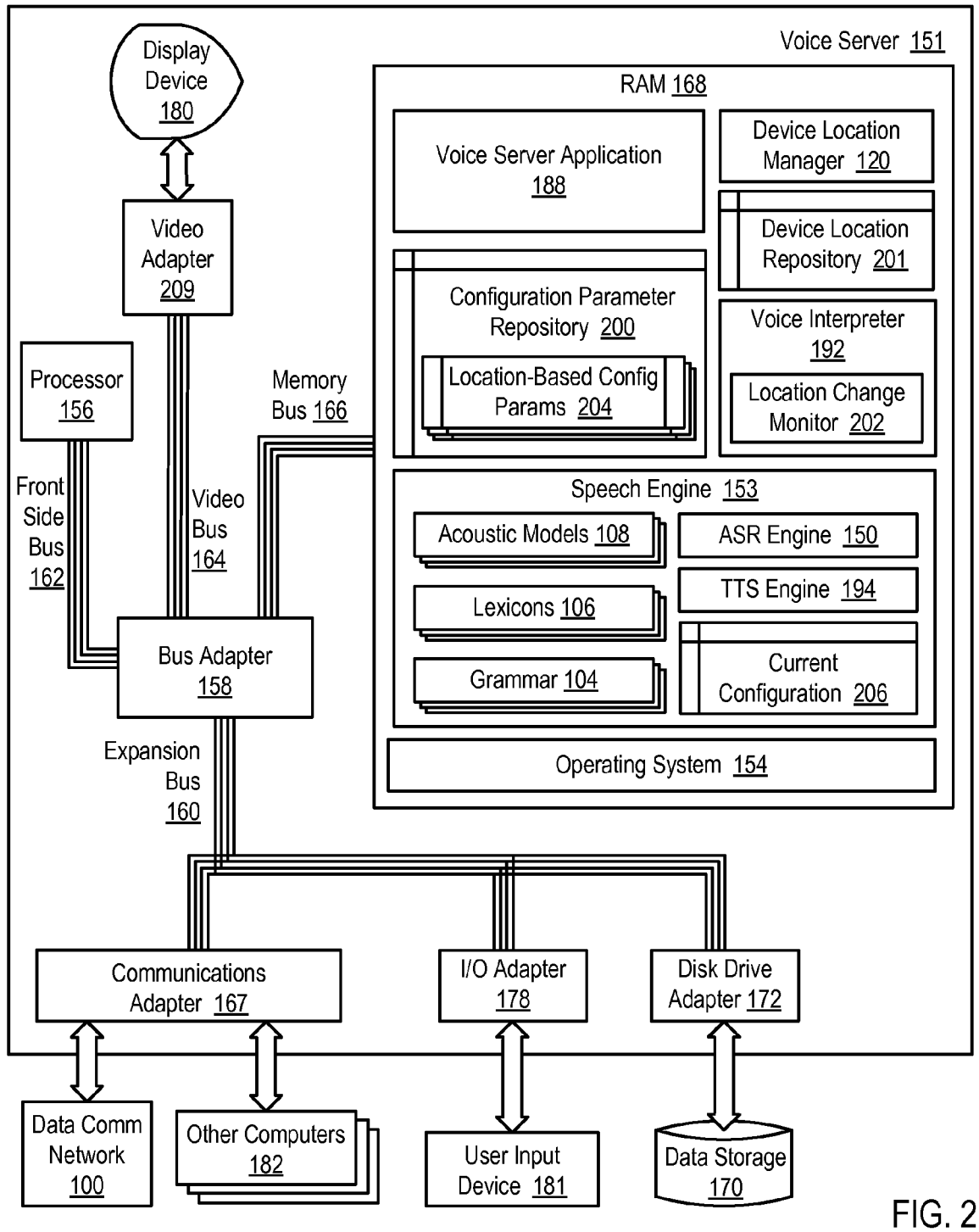
FIG. 2 sets forth a block diagram of automated computing machinery comprising an example of a computer useful as a voice server in configuring a speech engine for a multimodal application based on location according to embodiments of the present invention.

In the example of FIG. 2, the speech engine (153) operates according to the current configuration (206) for the speech engine (153). The current configuration (206) may specify the active lexicon and the active language-specific acoustic model used by the speech engine (153) to recognize and synthesize human speech. The current configuration (206) may also specify a current configuration for the automatic speech recognition ('ASR') engine such as, for example, speech transition times, silence detection times, speech timeouts, and gain maps. Furthermore, the current configuration (206) may also specify a configuration for use by a text-to-speech ('TTS') engine such as, for example, the voice used in synthesizing speech from text.

In the example of FIG. 2, the voice interpreter (192) includes a location change monitor (202), a software component that operates to configure a speech engine (153) for a multimodal application (195) based on location according to embodiments of the present invention. The location change monitor (202) of FIG. 2 configures a speech engine (153) for a multimodal application (195) based on location according to embodiments of the present invention by receiving from a device location manager (120) a location change notification that specifies a current location of the multimodal device, identifying, in a configuration parameter repository (200), location-based configuration parameters (204) for the speech engine (153) in dependence upon the current location of the multimodal device, and updating a current configuration for the speech engine (153) according to the identified location-based configuration parameters. As mentioned above, the location-based configuration parameters (204) specify a configuration for the speech engine (153) at the current location.

The device location manger (120) of FIG. 2 is a software component that determines the current location of a multimodal device based on the geographic coordinates provided by a position detection component installed in the multimodal device. The position detection component is a component, such as a GPS receiver or LORAN receiver, that calculates the geographic coordinates of the multimodal device in which the position detection component is installed and provides those coordinates to various modules such as the device location manager (120). The device location manager (120) is operatively coupled to a position detection component of a multimodal device through data communications network (100) and a position detection module. The position detection module operates as a software driver installed on the multimodal device for the position detection component and provides an interface for other software components, such as the device location manager (120), to interact with the position detection component.

The location of the multimodal device determined by the device location manager (120) may merely be specified as the geographic coordinates themselves such as, for example, (26°38'7.27"N, 80°13'37.22"W) that the device location manager (120) receives from the position detection component of multimodal device. In other embodiments, however, the location may be specified as a semantic representation of the coordinates such as, for example, 'home,' 'work,' or 'church.' To implement the location of a multimodal device using a semantic representation, the device location manager may access a device location repository (201) that associates location semantics with a set of geographic coordinates. For further explanation, consider the exemplary device location repository, shown rendered using XML schema,

```
<device location repository>
    <device id = "1">
        <location semantic = "church"
            centercoordinate = "(26.6351245°N, 80.2261248°W)"
            radius = "200 feet"/>
        <location semantic = "house"
            coordinate1 = "(26.0202777°N, 80.0400210°W)"
            coordinate2 = "(26.0204166°N, 80.0400210°W)"
            coordinate3 = "(26.0204166°N, 80.0398822°W)"
            coordinate4 = "(26.0202777°N, 80.0398822°W)"/>
        ...
    </device>
    <device id = "2">
        ...
    </device>
    ...
</device location repository>,
``` which maintains location semantics for multiple multimodal devices that request voice services from voice server (151). Using the exemplary device location repository above, the device location manager (120) may determine that the current location of the multimodal is 'church' if the coordinates received from the position detection component of the device indicate that the device is within a circular region centered at the coordinate (26.6351245°N, 80.2261248°W) and having a radius of 200 feet. Using the exemplary device location repository above, the device location manager (120) may determine that the current location of the multimodal device is 'house' if the coordinates received from the position detection component of the device indicate that the device is within an enclosed region defined by the coordinates (26.0202777°N, 80.0400210°W), (26.0204166°N, 80.0400210°W), (26.0204166°N, 80.0398822°W), and (26.0202777°N, 80.0398822°W). Readers will note that the values and the format for the exemplary device location repository above are for explanation and not for limitation.

Readers will also note that the device location repository (201) may contain location semantics for more than one multimodal device, as illustrated in the exemplary device location repository above. Although such an implementation is useful when the device location manager (120) manages the location of multiple multimodal devices, the device location repository (201) may contain only the location semantics relevant to a single multimodal device when the device location manager (120) is installed on the multimodal device itself.

In the example of FIG. 2, the device location manager (120) maintains the device location repository (201). The device location manager (120) may receive location definitions that associate a location semantic with a geographic coordinate from a user through a device location manager client operating on a multimodal device. Through a user interface provided by a device location manager client, a user may associate particular location semantics with geographic coordinates. For example, a user may manually enter coordinates into a user interface and associate those coordinates with a location semantic chosen by the user. The user may also instruct the device location manager client to capture the coordinates of the device's current position and associate those captured coordinates with a location semantic. The device location manager client then provides the data received from the user to the device location manager (120), which in turn stores the location definition into the device location repository (201). In other embodiments, the device location manager (120) may retrieve coordinates and their associated location semantics from data storage (170) or some other repository connected to the network (100).

As mentioned above, the location change monitor (202) identifies, in a configuration parameter repository (200), location-based configuration parameters (204) for the speech engine (153) in dependence upon the current location (504) of the multimodal device. The configuration parameter repository (200) of FIG. 2 associates location-based configuration parameters (204) with particular locations of a multimodal device. The location-based configuration parameters (204) of FIG. 2 specify a configuration for the speech engine (153) based on location. For example, the location-based configuration parameters (204) may specify a configuration for use by an automatic speech recognition ('ASR') engine (150) of the speech engine (153) at a location such as speech transition times, silence detection times, speech timeouts, and gain maps. The location-based configuration parameters (204) may also specify a configuration for use by the TTS engine (194) of the speech engine (153) at a location such as the voice used to synthesize text. The location-based configuration parameters (204) may further specify an acoustic model (108) for use by the speech engine (153) at a location. The location-based configuration parameters (204) may specify a lexicon (106) for use by the speech engine (153) at a location. For further explanation, consider the exemplary configuration parameter repository,

```
<configuration parameter repository>
    <device id = "1">
        <parameter id = "TTS.voice" location = "house">
            Luke Skywalker
        </parameter>
```

-continued

```
        <parameter id = "TTS.voice" location = "work">
            Yoda
        </parameter>
        <parameter id = "lexicon.language" location = "United
        States">
            english
        </parameter>
        <parameter id = "ASR.accent" location = "Boston">
            Bostonian
        </parameter>
        <parameter id = "ASR.accent" location = "Texas">
            Texan
        </parameter>
        ...
    </device>
    <device id = "2">
        ...
    </device>
    ...
</configuration parameter repository>,
``` which maintains exemplary location-based configuration parameters 'TTS.voice,' 'ASR.language,' and 'ASR.accent' useful in configuring a speech engine for a multimodal application based on location according to embodiments of the present invention. Using the exemplary interpreter configuration repository above, the location change monitor (202) may identify a location-based configuration parameter 'TTS.voice' having a value of 'Luke Skywalker' for use in configuring the speech engine (153) when the current location of the multimodal device is 'house.' A value of 'Luke Skywalker' for the 'TTS.voice' parameter specifies that the TTS engine should synthesize text using the voice of Luke Skywalker. Using the exemplary interpreter configuration repository above, the location change monitor (202) may identify a location-based configuration parameter 'TTS.voice' having a value of 'Yoda' for use in configuring the speech engine (153) when the current location of the multimodal device is 'work.' A value of 'Yoda' for the 'TTS.voice' parameter specifies that the TTS engine should synthesize text using the voice of Luke Skywalker.

Using the exemplary interpreter configuration repository above, the location change monitor (202) may identify a location-based configuration parameter 'lexicon.language' having a value of 'english' for use in configuring the speech engine (153) when the current location of the multimodal device is 'United States.' A value of 'english' for the 'lexicon.language' parameter specifies that the speech engine (153) should use the English language lexicon as the active lexicon for providing voice services. Using the exemplary interpreter configuration repository above, the location change monitor (202) may identify a location-based configuration parameter 'ASR.accent'having a value of 'Bostonian' for use in configuring the speech engine (153) when the current location of the multimodal device is 'Boston.' A value of 'Bostonian' for the 'ASR.accent' parameter specifies that the ASR engine should be tuned for recognizing a person's voice with a Bostonian accent. Using the exemplary interpreter configuration repository above, the location change monitor (202) may identify a location-based configuration parameter 'ASR.accent' having a value of 'Texan' for use in configuring the speech engine (153) when the current location of the multimodal device is 'Texas.' A value of 'Texan' for the 'ASR.accent' parameter specifies that the ASR engine should be tuned for recognizing a person's voice with a Texan accent. Readers will note that the values and the format for the exemplary configuration parameter repository above are for explanation and not for limitation.

Readers will note that the configuration parameter repository (200) may contain location-based configuration parameters for more than one multimodal device, as illustrated in the exemplary interpreter configuration repository above. Although such an implementation is useful in a thin client architecture where the speech engine (153) provides voice services to multiple multimodal devices from a server, the configuration parameter repository (200) may only contain location-based configuration parameters particular to a single multimodal device in a thick client architecture where the speech engine (153) typically executes locally on a multimodal device.

In the example of FIG. 2, the location change monitor (202) maintains the configuration parameter repository (200) that associates location-based configuration parameters (204) with particular locations of a multimodal device. The location change monitor (202) may receive entries for the configuration parameter repository (200) from users through a user interface provided by the location change monitor (202). In a thin client architecture, such as the one illustrated in FIG. 2, where the location change monitor (202) may not be installed on the multimodal device, a location change monitor client may be installed on the multimodal device that provides a user interface to a user to receive entries for the configuration parameter repository (200). The location change monitor client then in turn provides the user input to the location change monitor (202) installed on the voice server (151). To ensure that the locations for which a user specifies location-based configuration parameters (204) match the location managed by the device location manager (120), the location change monitor (202) may register with the device location manager (120) to receive notification of changes to the location definitions specified in the device location repository (201).

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), voice server application (188), voice interpreter (192), speech engine (153), device location manager (120), device location repository (201), and configuration parameter repository (200) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for configuring a speech engine for a multimodal application based on location according to embodiments of the present invention include modems for wired dial-up communications, Ethernet (IEEE 802.3) adapters for wired data communications network communications, and 802.11 adapters for wireless data communications network communications.

Figure 3:
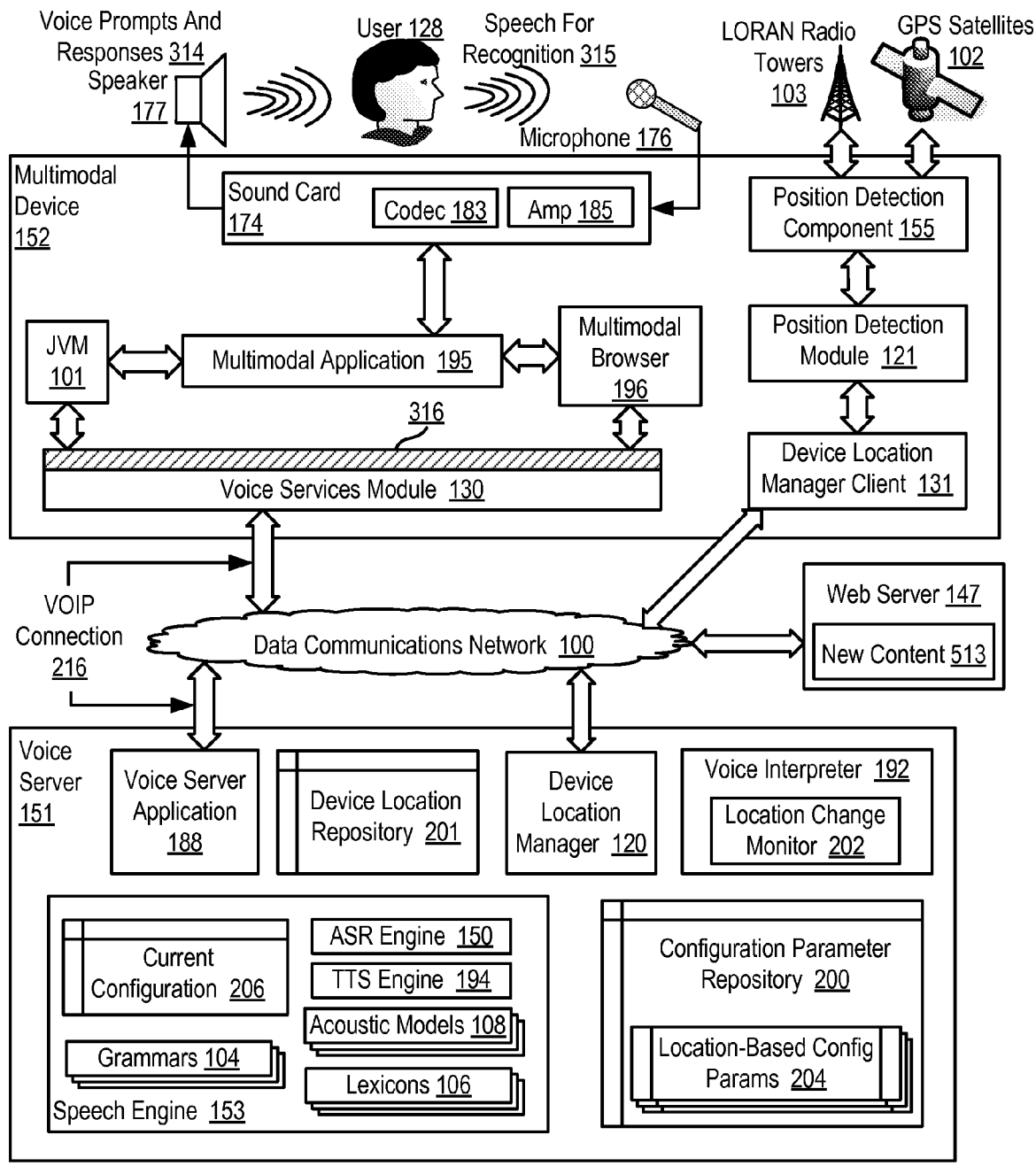
FIG. 3 sets forth a functional block diagram of exemplary apparatus for configuring a speech engine for a multimodal application based on location according to embodiments of the present invention.

For further explanation, FIG. 3 sets forth a functional block diagram of exemplary apparatus for configuring a speech engine for a multimodal application based on location in a thin client architecture according to embodiments of the present invention. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), grammars (104), lexicons (106), language-specific acoustic models (108), and a TTS engine (194), as well as a voice interpreter (192), configuration parameter repository (200), a device location manager (120), and a device location repository (201). The voice interpreter (192) of FIG. 3 is implemented as a VoiceXML interpreter that interprets and executes VoiceXML dialog instructions received from the multimodal application and provided to voice interpreter (192) through voice server application (188). VoiceXML input to the voice interpreter (192) may originate from the multimodal application (195) implemented as an X+V client running remotely on the multimodal device (152). As noted above, the multimodal application (195) also may be implemented as a Java client application running remotely on the multimedia device (152), a SALT application running remotely on the multimedia device (152), and in other ways as may occur to those of skill in the art.

The voice interpreter (192) of FIG. 3 includes a location change monitor (202), a software module for configuring a speech engine for a multimodal application based on location according to embodiments of the present invention. The voice interpreter (192) of FIG. 3 operates generally for configuring the speech engine (153) for the multimodal application (195) based on location according to embodiments of the present invention by receiving from a device location manager (120) a location change notification that specifies a current location of the multimodal device (152), identifying, in a configuration parameter repository (200), location-based configuration parameters (204) for the speech engine (153) in dependence upon the current location of the multimodal device (152), and updating a current configuration (206) for the speech engine (153) according to the identified location-based configuration parameters. As mentioned above, the location-based configuration parameters (204) specify a configuration for the speech engine (153) at the current location.

The device location manager (120) of FIG. 3 is a set of computer program instructions that determines the current location for a multimodal device (152) based on the position of the device (152) provided by a position detection component (155) of the device (152) and provides the current location in a location change notification to the location change monitor (202). The position detection component (155) is a component that calculates the geographic coordinates of the multimodal device (155) and provides those coordinates to various modules such as the device location manager (120). The position detection component (155) of FIG. 3 may be implemented as a GPS receiver that receives signals from a group of GPS satellites (102), a LORAN receiver the receives signals from a group of LORAN radio towers (103), or any other component capable of calculating the geographic coordinates of the multimodal device as occurs to those of skill in the art.

In the example of FIG. 3, the device location manager (120) is operatively coupled to the position detection component (155) of the multimodal device (152) through network (100), a device location manager client (131), and position detection module (121). The position detection module (121) operates as a software driver for the position detection component and provides an interface for other software components, such as the device location manager (120) and the device location manager client (131), to interact with the position detection component. The device location manager client (131) of FIG. 3 is a software module that provides data communications between the position detection module (121) on the multimodal device (152) and the device location manager (120) on voice server (151). In addition, the device location manager client (131) may also provide a user interface to user (128) for receiving a location definition that associates location semantics with geographic coordinates provided by the position detection component (155). The device location manager client (131) of FIG. 3 may, in turn, provide the location definition to the device location manager (120), which stores the location definition in the device location repository (201).

As mentioned above, the VOIP connection (216) connects for data communication the multimodal device (152) and the voice server (151). VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) supports text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to voice interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The multimodal application (195) is operatively coupled to the ASR engine (150). In this example, the operative coupling between the multimodal application and the ASR engine (150) is implemented with a VOIP connection (216) through a voice services module (130), then through the voice server application (188) and the voice interpreter (192). Depending on whether the multimodal application is implemented in X+V, Java, or SALT, the voice interpreter (192) may be implemented using a VoiceXML interpreter, a VoiceXML interpreter exposing a Java interface, or a SALT interpreter. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195), JVM (101), and multimodal browser (196).

The voice services module (130) provides data communications services through the VOIP connection and the voice server application (188) between the multimodal device (152) and the voice interpreter (192). The API (316) is the same API presented to applications by a voice interpreter when the voice interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 4:
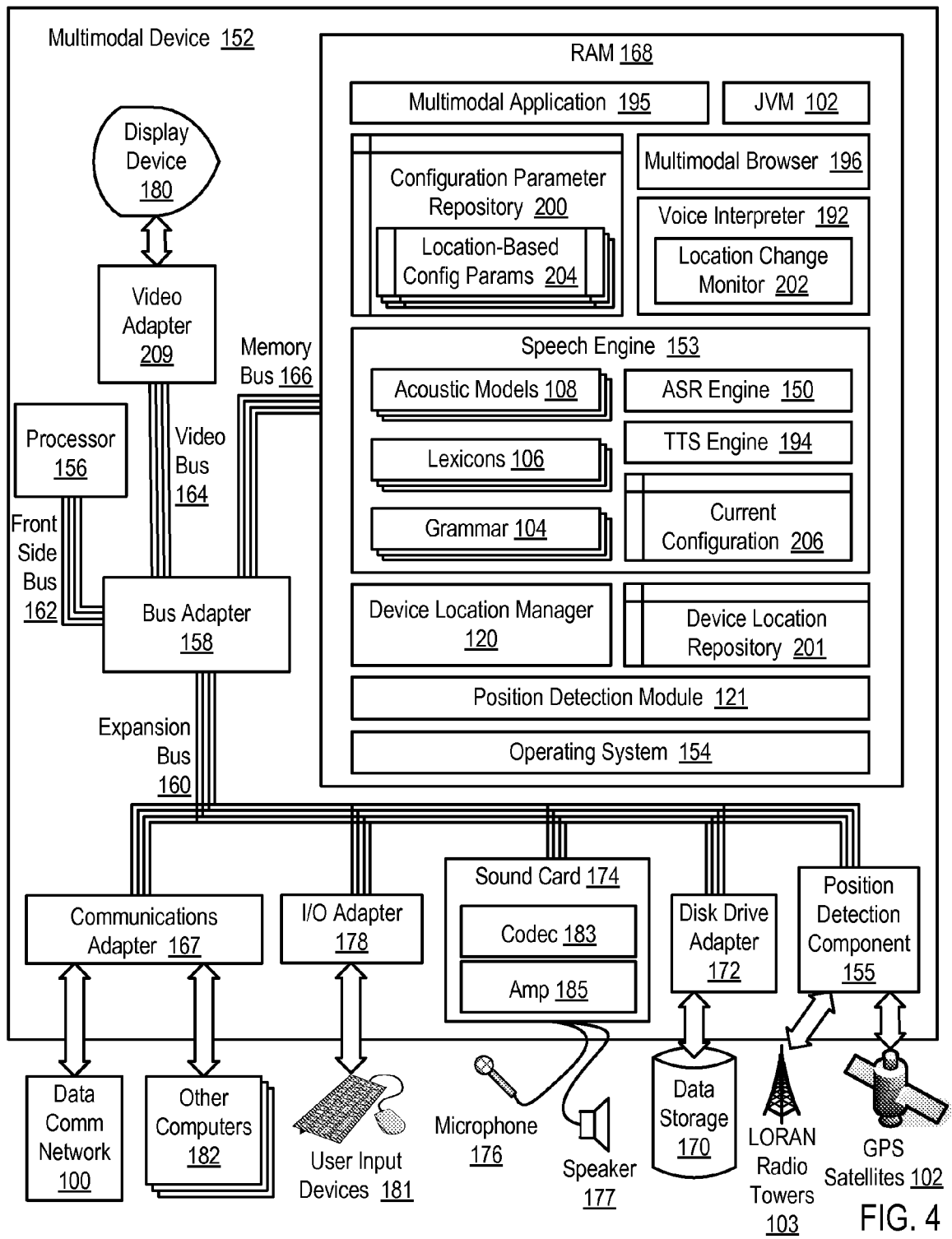
FIG. 4 sets forth a block diagram of automated computing machinery comprising an example of a computer useful as a multimodal device in configuring a speech engine for a multimodal application based on location according to embodiments of the present invention.

Configuring a speech engine for a multimodal application based on location according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in configuring a speech engine for a multimodal application based on location according to embodiments of the present invention. In a multimodal device implementing a thick client architecture as illustrated in FIG. 4, the multimodal device (152) has no connection to a remote voice server containing a voice interpreter and a speech engine. All the components needed for speech synthesis and voice recognition in configuring a speech engine for a multimodal application based on location according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a voice interpreter (192), a speech engine (153), and so on. As in the system of FIG. 2, the speech engine in the multimodal device of FIG. 4 includes an ASR engine (150), grammars (104), lexicons (106), language-dependent acoustic models (108), and a TTS engine (194). The voice interpreter (192) may be implemented as a VoiceXML interpreter that administers dialogs by processing the dialog instructions sequentially in accordance with a VoiceXML Form Interpretation Algorithm ('FIA').

The speech engine (153) in this kind of embodiment, a thick client architecture, often is implemented as an embedded module in a small form factor device such as a handheld device, a mobile phone, PDA, and the like. An example of an embedded speech engine that may be improved for configuring a speech engine for a multimodal application based on location according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports multiple modes of user interaction, including a voice mode and one or more non-voice modes. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded voice interpreter (192) for processing. The embedded voice interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes on Java Virtual Machine (102) and issues calls through an API of the voice interpreter (192) for speech recognition and speech synthesis services. In further exemplary embodiments, the multimodal application (195) may be implemented as a set or sequence of SALT documents executed on a multimodal browser (196) or microbrowser that issues calls through an API of the voice interpreter (192) for speech recognition and speech synthesis services. In addition to X+V, SALT, and Java implementations, multimodal application (195) may be implemented in other technologies as will occur to those of skill in the art, and all such implementations are well within the scope of the present invention.

The voice interpreter (192) of FIG. 4 includes a location change monitor (202), a software module for configuring a speech engine for a multimodal application based on location according to embodiments of the present invention. The voice interpreter (192) of FIG. 4 operates generally for configuring the speech engine (153) for the multimodal application (195) based on location according to embodiments of the present invention by receiving from a device location manager (120) a location change notification that specifies a current location of the multimodal device (152), identifying, in a configuration parameter repository (200), location-based configuration parameters (204) for the speech engine (153) in dependence upon the current location of the multimodal device (152), and updating a current configuration (206) for the speech engine (153) according to the identified location-based configuration parameters. As mentioned above, the location-based configuration parameters (204) specify a configuration for the speech engine (153) at the current location. The current configuration (206) of FIG. 4 specifies the operating settings, parameters, and other variable used by the speech engine (153) to provide voice services.

The device location manager (120) of FIG. 4 is a set of computer program instructions that determines the current location for a multimodal device (152) based on the position of the device (152) provided by a position detection component (155) of the device (152) and provides the current location in a location change notification to the location change monitor (202). As mentioned above, the location of the multimodal device (152) may be specified as the geographic coordinates provided by the position detection component (155) such as, for example, (26°38'7.27"N, 80°13'37.22"W). In FIG. 4, however, the location is specified as a semantic representation of the coordinates such as, for example, 'home,' 'work,' or 'church.' In the example of FIG. 4, the device location manager (120) may determine the current location for a multimodal device (152) based on the position of the device (152) by identifying a location in a device location repository (201) based on the geographic coordinates provided by the position detection component (155). The device location repository (201) of FIG. 4 is a data structure that associates location semantics with a set of geographic coordinates.

In the example of FIG. 4, the position detection component (155) is a component that calculates the geographic coordinates of the multimodal device (152) and provides those coordinates to various modules such as the device location manager (120). The position detection component (155) of FIG. 4 may be implemented as a GPS receiver that receives signals from a group of GPS satellites (102), a LORAN receiver the receives signals from a group of LORAN radio towers (103), or any other component capable of calculating the geographic coordinates of the multimodal device as occurs to those of skill in the art.

In the example of FIG. 4, the device location manager (120) is operatively coupled to the position detection component (155) of the multimodal device (152) through a position detection module (121). The position detection module (121) operates as a software driver for the position detection component (155) and provides an interface for other software components, such as the device location manager (120), to interact with the position detection component (155).

The multimodal application (195) of FIG. 4 is operatively coupled to the ASR engine (150). In this example, the operative coupling between the multimodal application and the ASR engine (150) is implemented through the voice interpreter (192). Depending on whether the multimodal application is implemented in X+V, Java, or SALT, the voice interpreter (192) may be implemented as a VoiceXML interpreter, a VoiceXML interpreter exposing a Java interface, or SALT interpreter.

When the multimodal application (195) is implemented in X+V, the operative coupling is effected through the multimodal browser (196), which provides an operating environment and an interpreter for the X+V application, and then through a VoiceXML interpreter, which passes grammars and voice utterances for recognition to the ASR engine. When the multimodal application (195) is implemented in Java Speech, the operative coupling is effected through the JVM (101), which provides an operating environment for the Java application and the voice interpreter (192), which passes grammars and voice utterances for recognition to the ASR engine (150). When the multimodal application (195) is implemented in SALT, the operative coupling is effected through the multimodal browser (196), which provides an operating environment and an interpreter for the X+V application, and then through a SALT interpreter, which passes grammars and voice utterances for recognition to the ASR engine.

The multimodal application (195) in this example, running on a multimodal device (152) that contains its own voice interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application is implemented on the multimodal device itself.

Figure 5:
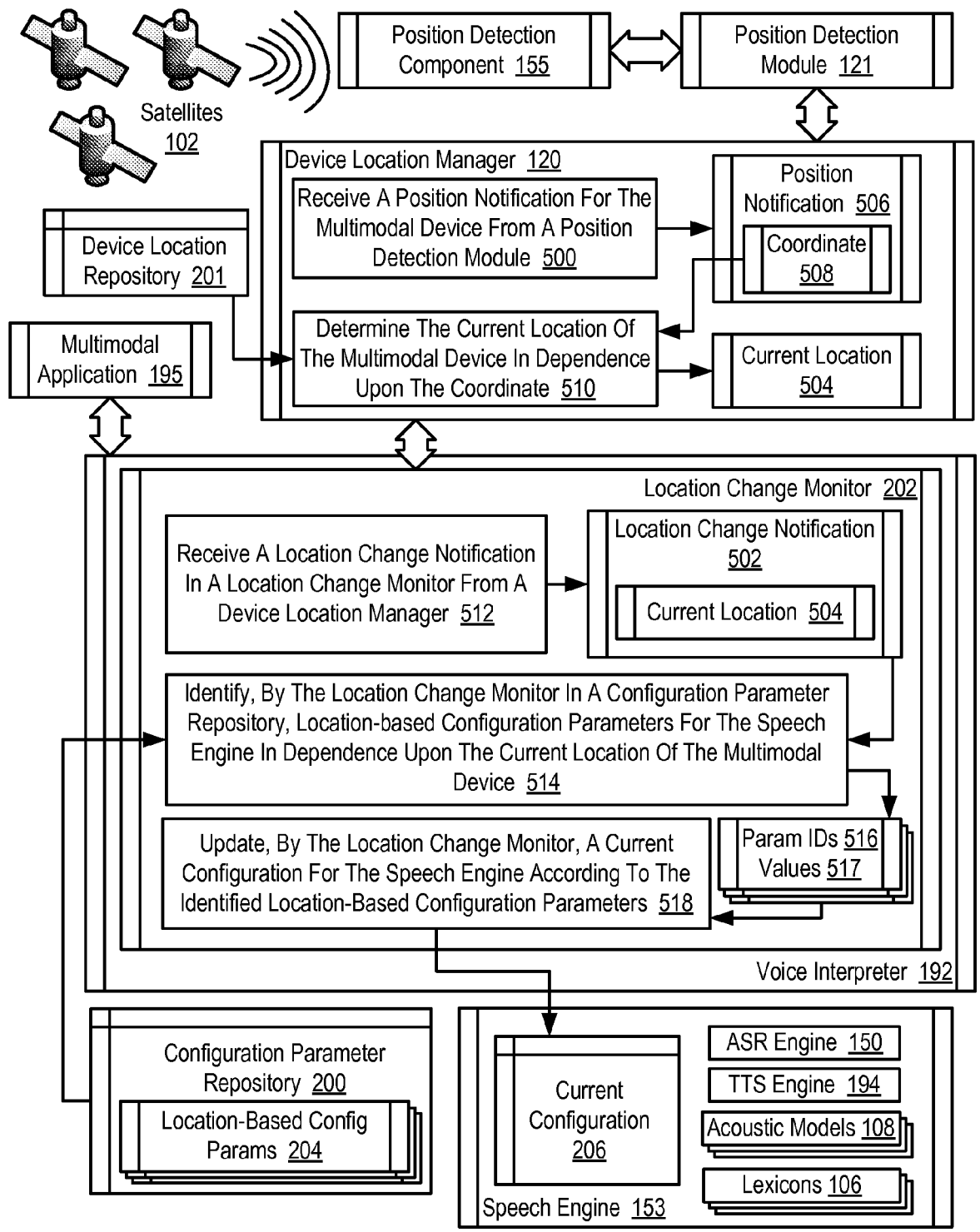
FIG. 5 sets forth a flow chart illustrating an exemplary method of configuring a speech engine for a multimodal application based on location according to embodiments of the present invention.

For further explanation, FIG. 5 sets forth a flow chart illustrating an exemplary method of configuring a speech engine (153) for a multimodal application (195) based on location according to embodiments of the present invention. The multimodal application (195) of FIG. 5 operates on a multimodal device supporting multiple modes of user interaction with the multimodal application (195). The modes of user interaction include a voice mode and one or more non-voice modes. The multimodal application (195) is operatively coupled to a speech engine (153).

The method of FIG. 5 includes receiving (500) a position notification (506) in the device location manager (120) for the multimodal device from a position detection module (121). The position detection module (121) is a software driver that provides an interface for software to communicate with the position detection component (155) using an exposed API. The position notification (506) of FIG. 5 is a message that specifies a geographic coordinate (508) for the multimodal device. The geographic coordinate (508) of FIG. 5 specifies the physical position of the multimodal device relative to the earth using latitude and longitude. In some embodiments, the geographic coordinate (508) may also specify the physical position of the multimodal device relative to the earth using altitude. An example of a geographic coordinate useful in configuring a speech engine for a multimodal application based on location according to embodiments of the present invention may include (26°38'7.27"N, 80°13'37.22"W).

The device location manager (120) may receive (500) a position notification (506) for the multimodal device from a position detection module (121) according to the method of FIG. 5 by registering with the position detection module (121) to receive position notifications from the position detection module (121). In the method of FIG. 5, the device location manager (120) may receive (500) position notifications (506) for the multimodal device periodically at a predetermined interval or when the position detection module (121) detects a change in the multimodal device's location.

In the example of FIG. 5, the position detection module (121) is operatively coupled to the position detection component (155) of the multimodal device. The position detection component (155) is a component of the multimodal device, typically implemented using a combination of hardware and software, that calculates geographic coordinates representing the current position of the multimodal device. In the exemplary system of FIG. 5, the position detection component (155) is implemented using a global positioning system ('GPS') receiver that calculates the geographic coordinates of the device based on the device's position relative to a group of GPS satellites (102). The use of GPS, however, is for explanation and not for limitation. In other embodiments of the present invention, the position detection component may be implemented using a Long Range Navigation ('LORAN') receiver that calculates the geographic coordinates of the device based on the device's position relative to a group of LORAN radio transmission towers or any other component for calculating the geographic coordinate of a multimodal device as will occur to those of skill in the art.

The method of FIG. 5 also includes determining (510), by the device location manager (120), the current location (504) of the multimodal device in dependence upon the geographic coordinate (508). The device location manger (120) may determine (510) the current location (504) of the multimodal device according to the method of FIG. 5 using a device location repository (201). The current location (504) of FIG. 5 may specify the position of the multimodal device using geographic coordinates such as, for example (26°38'7.27"N, 80°13'37.22"W), or semantic representations of those coordinates such as, for example, 'house,' 'work,' or 'church.' When the location of the multimodal device is specified as a semantic representation of the coordinates received from the position detection component (155), the device location manager (120) may determine the current location (504) by identifying a location semantic in a device location repository (201) associated with the geographic coordinates received from the position detection component (155). For further explanation, consider the exemplary device location repository,

```
<device location repository>
    <location semantic = "church"
        centercoordinate = "(26.6351245°N, 80.2261248°W)"
        radius = "200 feet"/>
    <location semantic = "house"
        coordinate1 = "(26.0202777°N, 80.0400210°W)"
        coordinate2 = "(26.0204166°N, 80.0400210°W)"
        coordinate3 = "(26.0204166°N, 80.0398822°W)"
        coordinate4 = "(26.0202777°N, 80.0398822°W)"/>
    ...
</device location repository>,
``` which associates location semantics for the multimodal device with geographic coordinates. Using the exemplary device location repository above, the device location manager (120) may determine that the current location of the multimodal is 'church' if the coordinates received from the position detection component (155) indicate that the device is within a circular region centered at the coordinate (26.6351245°N, 80.2261248°W) and having a radius of 200 feet. Using the exemplary device location repository above, the device location manager (120) may determine that the current location of the multimodal device is 'house' if the coordinates received from the position detection component (155) indicate that the device is within an enclosed region defined by the coordinates (26.0202777°N, 80.0400210°W), (26.0204166°N, 80.0400210°W), (26.0204166°N, 80.0398822°W), and (26.0202777°N, 80.0398822°W). Readers will note that the values and the format for the exemplary device location repository above are for explanation and not for limitation.

The method of FIG. 5 also includes receiving (512) a location change notification (502) in a location change monitor (202) from a device location manager (120). The location change notification (502) of FIG. 5 is a message that specifies a current location (504) of the multimodal device. In the method of FIG. 5, the location change monitor (202) may receive the location change notification (502) from the device location manager (120) according to the method of FIG. 5 by registering with the device location manager (120) to receive location change notifications through an API exposed by the device location manager (120). In some embodiments where the device location manager (120) and the location change monitor (202) are installed on separate network-connected computers, the location change monitor (202) may register to receive the location change notifications with a device location manager client operating on the same computer as the location change monitor (202). The device location manager client then, in turn, communicates with the device location manager (120) across a network. In the method of FIG. 5, the location change monitor (202) may receive location change notifications from the device location manager (120) periodically at predetermined intervals or when the device location manager (120) identifies a change in the location of the multimodal device.

In the example of FIG. 5, the device location manager (120) is operatively coupled to a position detection component (155). The device location manager (120) is 'operatively coupled' to the position detection component (155) in the sense that the device location manager (120) communicates with the position detection module (121), a software driver for the position detection component (155) that provides interaction with the position detection component (155) through an exposed API. Such communication may occur locally on the multimodal device when the device location manager (120) is installed on the multimodal device or may occur across a network when the device location manager (120) is installed on a server, such as voice server (see FIG. 3), which manages the locations of multiple multimodal devices.

The method of FIG. 5 also includes identifying (514), by the location change monitor (202) in a configuration parameter repository (200), location-based configuration parameters (204) for the speech engine (153) in dependence upon the current location (504) of the multimodal device. The location change monitor (202) identifies (514) location-based configuration parameters (204) for the speech engine (153) according to the method of FIG. 5 by retrieving the parameter identifiers (516) and parameter values (517) for the location-based configuration parameters (204) associated with a location that match the current location (504).

The configuration parameter repository (200) of FIG. 5 associates location-based configuration parameters (204) with particular locations of a multimodal device. The location-based configuration parameters (204) of FIG. 5 specify a configuration for the speech engine (153) based on location. For example, the location-based configuration parameters (204) may specify a configuration for use by an automatic speech recognition ('ASR') engine of the speech engine (153)

at a location, such as, for example, speech transition times, silence detection times, speech timeouts, and gain maps. The location-based configuration parameters (204) may also specify a configuration for use by a TTS engine of the speech engine (153) at a location, such as, for example, the voice used to synthesize text. The location-based configuration parameters (204) of FIG. 5 may further specify an acoustic model (108) for use by the speech engine (153) at a location. The location-based configuration parameters (204) may specify a lexicon (106) for use by the speech engine (153) at a location. For further explanation, consider the exemplary configuration parameter repository,

```
<configuration parameter repository>
    <parameter id = "TTS.voice" location = "house">
        Luke Skywalker
    </parameter>
    <parameter id = "TTS.voice" location = "work">
        Yoda
    </parameter>
    <parameter id = "lexicon.language" location = "United States">
        english
    </parameter>
    <parameter id = "ASR.accent" location = "Boston">
        Bostonian
    </parameter>
    <parameter id = "ASR.accent" location = "Texas">
        Texan
    </parameter>
    ...
</configuration parameter repository>,
``` which maintains exemplary location-based configuration parameters 'TTS.voice,' 'ASR.language,' and 'ASR.accent' useful in configuring a speech engine for a multimodal application based on location according to embodiments of the present invention. Using the exemplary interpreter configuration repository above, the location change monitor (202) may identify a location-based configuration parameter 'TTS.voice' having a value of 'Luke Skywalker' for use in configuring the speech engine (153) when the current location of the multimodal device is 'house.' A value of 'Luke Skywalker' for the 'TTS.voice' parameter specifies that the TTS engine should synthesize text using the voice of Luke Skywalker. Using the exemplary interpreter configuration repository above, the location change monitor (202) may identify a location-based configuration parameter 'TTS.voice' having a value of 'Yoda' for use in configuring the speech engine (153) when the current location of the multimodal device is 'work.' A value of 'Yoda' for the 'TTS.voice' parameter specifies that the TTS engine should synthesize text using the voice of Luke Skywalker.

Using the exemplary interpreter configuration repository above, the location change monitor (202) may identify a location-based configuration parameter 'lexicon.language' having a value of 'english' for use in configuring the speech engine (153) when the current location of the multimodal device is 'United States.' A value of 'english' for the 'lexicon.language' parameter specifies that the speech engine (153) should use the English language lexicon as the active lexicon for providing voice services. Using the exemplary interpreter configuration repository above, the location change monitor (202) may identify a location-based configuration parameter 'ASR.accent' having a value of 'Bostonian' for use in configuring the speech engine (153) when the current location of the multimodal device is 'Boston.' A value of 'Bostonian' for the 'ASR.accent' parameter specifies that the ASR engine should be tuned for recognizing a person's voice with a Bostonian accent. Using the exemplary interpreter configuration repository above, the location change monitor (202) may identify a location-based configuration parameter 'ASR.accent' having a value of 'Texan' for use in configuring the speech engine (153) when the current location of the multimodal device is 'Texas.' A value of 'Texan' for the 'ASR.accent' parameter specifies that the ASR engine should be tuned for recognizing a person's voice with a Texan accent. Readers will note that the values and the format for the exemplary interpreter configuration repository above are for explanation and not for limitation.

The method of FIG. 5 also includes updating (518), by the location change monitor (202), a current configuration (206) for the speech engine (153) according to the identified location-based configuration parameters. The current configuration (206) of FIG. 5 specifies the operating settings, parameters, and other variable used by the speech engine (153) to provide voice services. The current configuration (206) may specify the active lexicon and the active language-specific acoustic model used by the speech engine (153) to recognize and generate human speech. The current configuration (206) may also specify a current configuration for the automatic speech recognition ('ASR') engine such as, for example, speech transition times, silence detection times, speech timeouts, and gain maps. Furthermore, the current configuration (206) may also specify a configuration for use by a text-to-speech ('TTS') engine such as, for example, the voice used to synthesize the text.

The location change monitor (202) may update (518) a current configuration (206) for the speech engine (153) according to the method of FIG. 5 by identifying parameters in the current configuration (206) that match the parameter identifiers (516) for the identified location-based configuration parameters and storing the values (517) of the identified location-based configuration parameters in the identified parameters in the current configuration (206). Updating (518), by the location change monitor (202), a current configuration (206) for the speech engine (153) according to the identified location-based configuration parameters according to the method of FIG. 5 advantageously configures the speech engine (153) based on the current location (504) of the multimodal device.

In addition to configuring a speech engine for a multimodal application based on the location of the multimodal device, a speech engine may also be configured based on the speed of the multimodal, that is, based on location and the time it takes for the multimodal device to change from one location to another. Configuring a multimodal device based on speed may be advantageously used to substitute the speech engine's default acoustic model with an acoustic model tuning for the more noisy environments that often accompany the multimodal device as the device's speed increases. For further explanation, therefore, FIG. 6 sets forth a flow chart illustrating a further exemplary method of configuring a speech engine (153) for a multimodal application (195) based on location according to embodiments of the present invention in which the location change notification (502) received from the device location manager (120) includes a timestamp (600). The timestamp (600) is a data element that specifies a time at which the multimodal device was at the current location (504).

Figure 6:
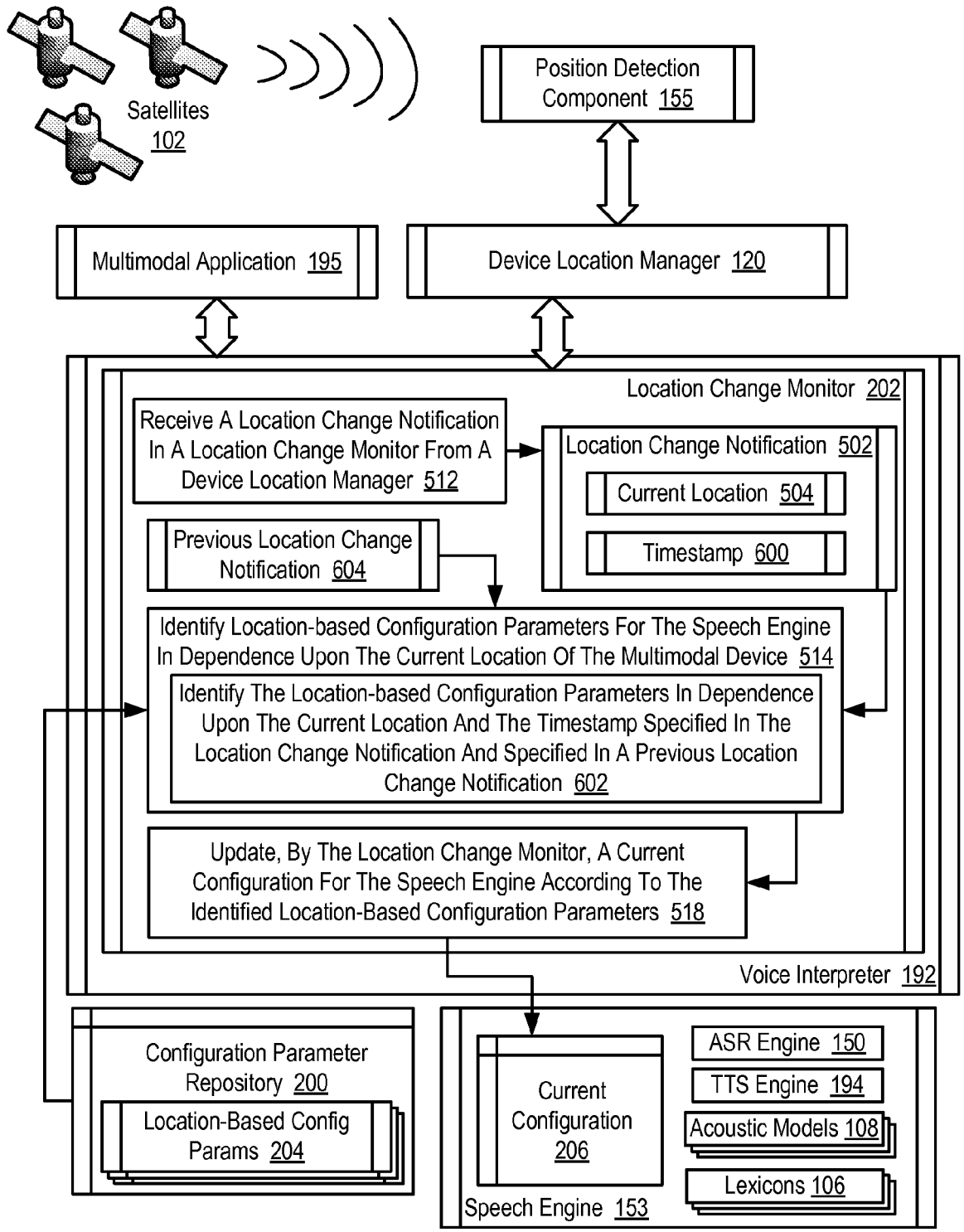
FIG. 6 sets forth a flow chart illustrating a further exemplary method of configuring a speech engine for a multimodal application based on location according to embodiments of the present invention.

The multimodal application (195) of FIG. 6 operates on a multimodal device supporting multiple modes of user interaction with the multimodal application (195). The modes of user interaction supported by the multimodal device include a voice mode and one or more non-voice modes. The multimodal application (195) is operatively coupled to a speech engine (153) through a voice interpreter (192).

The method of FIG. 6 is similar to the method of FIG. 5. That is, the method of FIG. 6 includes receiving (512), in a location change monitor (202) from a device location manager (120), a location change notification (502) specifying a current location (504) of the multimodal device, identifying (514), by the location change monitor (202) in a configuration parameter repository (200), location-based configuration parameters (204) for the speech engine (153) in dependence upon the current location (504) of the multimodal device, and updating (518), by the location change monitor (202), a current configuration (206) for the speech engine (153) according to the identified location-based configuration parameters (204). The location-based configuration parameters (204) of FIG. 6 specify a configuration for the speech engine (153) at the current location (504). The device location manager (120) of FIG. 6 is operatively coupled to a position detection component (155) of the multimodal device. The position detection component (155) of FIG. 6 is implemented using a global positioning system ('GPS') receiver that calculates the geographic coordinates of the device based on the device's position relative to a group of GPS satellites (102)

Identifying (514), by the location change monitor (202) in a configuration parameter repository (200), location-based configuration parameters (204) for the speech engine (153) according to the method of FIG. 6 includes identifying (602) the location-based configuration parameters (204) in the configuration parameter repository (200) in dependence upon the current location (504) and the timestamp (600) specified in the location change notification (502) and specified in a previous location change notification (604). The location change monitor (202) may identify (602) the location-based configuration parameters (204) in the configuration parameter repository (200) in dependence upon the current location (504) and the timestamp (600) according to the method of FIG. 6 by calculating the speed of the multimodal device using the previous location change notification (604) and the location change notification (502) and identifying a location-based configuration parameter in the configuration parameter repository (200) in dependence upon the calculated speed. For further explanation, consider the following exemplary configuration parameter repository:

```
<configuration parameter repository>
    <parameter id = "acousticmodel.id" speed = ">3.5 & <9">
        running
    </parameter>
    ...
</configuration parameter repository>
```

Using the above exemplary configuration parameter repository, the location change monitor (202) may identify the location-based configuration parameter 'acousticmodel.id' having a value of 'running' for updating the current configuration (206) of the speech engine (153) when the calculated speed is between 3.5 miles per hour and 9 miles per hour. Readers will note that the values and the format for the exemplary configuration parameter repository above are for explanation and not for limitation.

Exemplary embodiments of the present invention are described largely in the context of a fully functional computer system for configuring a speech engine for a multimodal application based on location. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of configuring a speech engine for a multimodal application based on location, the multimodal application operating on a multimodal device supporting multiple modes of user interaction with the multimodal application, the modes of user interaction including a voice mode and one or more non-voice modes, the multimodal application operatively coupled to a speech engine, the method comprising:

receiving a location change notification in a location change monitor from a device location manager, the device location manager operatively coupled to a position detection component of the multimodal device, the location change notification specifying a current location of the multimodal device;

identifying in a configuration parameter repository, location-based configuration parameters for the speech engine in dependence upon the current location of the multimodal device, the location-based configuration parameters specifying a configuration for the speech engine at the current location, wherein the location-based configuration parameters include an identifier for an acoustic model from among a plurality of acoustic models including a first acoustic model and a second acoustic model, an identifier for a lexicon from among a plurality of lexicons including a first lexicon and a second lexicon, speech transition times, silence detection times, speech timeouts, gain maps, and a configuration for use by a text-to-speech ('TTS') engine including a voice used in synthesizing speech from text, wherein each of the first acoustic model and the second acoustic model associates acoustic features with phonemes, wherein the first lexicon and the second lexicon specify a different phoneme representation for a same word; and updating, by the location change monitor, a current configuration for the speech engine according to the identified location-based configuration parameters.

2. The method of claim 1 further comprising:

receiving a position notification in the device location manager for the multimodal device from a position detection module, the position detection module operatively coupled to the position detection component of the multimodal device, the position notification specifying a geographic coordinate for the multimodal device; and determining, by the device location manager, the current location of the multimodal device in dependence upon the geographic coordinate.

3. The method of claim 1, wherein the first acoustic model and the second acoustic model associate different audio input with a same phoneme.

4. The method of claim 1, wherein the location change notification includes a timestamp specifying a time at which the multimodal device arrived at the current location, and wherein identifying the location-based configuration parameters in the configuration parameter repository comprises identifying the location-based configuration parameters based, at least in part, on the timestamp specified in the location change notification and at least one previous timestamp included in a previous location change notification.

5. An apparatus for configuring a speech engine for a multimodal application based on location, the multimodal application operating on a multimodal device supporting multiple modes of user interaction with the multimodal application, the modes of user interaction including a voice mode and one or more non-voice modes, the multimodal application operatively coupled to a speech engine, the apparatus comprising a computer processor and a computer memory operatively coupled to the computer processor, the computer memory having disposed within it computer program instructions that, when executed by the computer processor, perform a method of:
receiving a location change notification in a location change monitor from a device location manager, the device location manager operatively coupled to a position detection component of the multimodal device, the location change notification specifying a current location of the multimodal device;
identifying in a configuration parameter repository, location-based configuration parameters for the speech engine in dependence upon the current location of the multimodal device, the location-based configuration parameters specifying a configuration for the speech engine at the current location, wherein the location-based configuration include an identifier for an acoustic model from among a plurality of acoustic models including a first acoustic model and a second acoustic model, an identifier for a lexicon from among a plurality of lexicons including a first lexicon and a second lexicon, speech transition times, silence detection times, speech timeouts, gain maps, and a configuration for use by a text-to-speech ('TTS') engine including a voice used in synthesizing speech from text, wherein each of the first acoustic model and the second acoustic model associates acoustic features with phonemes, wherein the first lexicon and the second lexicon specify a different phoneme representation for a same word; and
updating, by the location change monitor, a current configuration for the speech engine according to the identified location-based configuration parameters.

6. The apparatus of claim 5 further comprising:
receiving a position notification in the device location manager for the multimodal device from a position detection module, the position detection module operatively coupled to the position detection component of the multimodal device, the position notification specifying a geographic coordinate for the multimodal device; and
determining, by the device location manager, the current location of the multimodal device in dependence upon the geographic coordinate.

7. The apparatus of claim 5, wherein the first acoustic model and the second acoustic model associate different audio input with a same phoneme.

8. The apparatus of claim 5, wherein the location change notification includes a timestamp specifying a time at which the multimodal device arrived at the current location, and wherein identifying the location-based configuration parameters in the configuration parameter repository comprises identifying the location-based configuration parameters based, at least in part, on the timestamp specified in the location change notification and at least one previous timestamp included in a previous location change notification.

9. A non-transitory computer readable recordable medium encoded with a plurality of instructions that, when executed on a computer, perform a method of configuring a speech engine for a multimodal application based on location, the multimodal application operating on a multimodal device supporting multiple modes of user interaction with the multimodal application, the modes of user interaction including a voice mode and one or more non-voice modes, the multimodal application operatively coupled to a speech engine, the method comprising:
receiving a location change notification in a location change monitor from a device location manager, the device location manager operatively coupled to a position detection component of the multimodal device, the location change notification specifying a current location of the multimodal device, wherein the location change notification includes a timestamp specifying a time at which the multimodal device arrived at the current location;
identifying in a configuration parameter repository, location-based configuration parameters for the speech engine in dependence upon the current location of the multimodal device, the location-based configuration parameters specifying a configuration for the speech engine at the current location, wherein the location-based configuration parameters include an identifier for an acoustic model from among a plurality of acoustic models including a first acoustic model and a second acoustic model, an identifier for a lexicon from among a plurality of lexicons including a first lexicon and a second lexicon, speech transition times, silence detection times, speech timeouts, gain maps, and a configuration for use by a text-to-speech ('TTS') engine including a voice used in synthesizing speech from text, wherein each of the first acoustic model and the second acoustic model associates acoustic features with phonemes, wherein the first lexicon and the second lexicon specify a different phoneme representation for a same word; and
updating, by the location change monitor, a current configuration for the speech engine according to the identified location-based configuration parameters.

10. The computer readable recordable medium of claim 9, wherein the first acoustic model and the second acoustic model associate different audio input with a same phoneme.

11. The computer readable recordable medium of claim 9, wherein the location change notification includes a timestamp specifying a time at which the multimodal device arrived at the current location, and wherein identifying the location-based configuration parameters in the configuration parameter repository comprises identifying the location-based configuration parameters based, at least in part, on the timestamp specified in the location change notification and at least one previous timestamp included in a previous location change notification.

* * * * *